(12) United States Patent
Lam et al.

(10) Patent No.: US 8,443,523 B2
(45) Date of Patent: May 21, 2013

(54) DOOR LOCK LOCATING TOOL KIT

(75) Inventors: Chin Hung Lam, Ma On Shan (HK);
Tsz Kin Wong, Ma On Shan (HK); Guo Hua Liang, Guangdong Province (CN);
Yu Xia, Guangdong Province (CN);
James E. Pangerc, Williamston, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 72 days.

(21) Appl. No.: 13/246,257

(22) Filed: Sep. 27, 2011

(65) Prior Publication Data

US 2012/0017452 A1 Jan. 26, 2012

Related U.S. Application Data

(63) Continuation of application No. PCT/CN2010/071879, filed on Apr. 19, 2010.

(51) Int. Cl.
*B27M 3/00* (2006.01)
*B27G 17/08* (2006.01)
*B27G 23/00* (2006.01)
*B25H 7/04* (2006.01)
*G01B 3/14* (2006.01)

(52) U.S. Cl.
USPC ............. 33/194; 33/197; 30/167.1; 30/167.2

(58) Field of Classification Search
USPC ........... 33/194, 197, 666, 667, 562; 30/167.1, 30/167.2; 83/565; 144/27, 144.51, 144.1; 7/163
See application file for complete search history.

(56) References Cited

U.S. PATENT DOCUMENTS

| | | | | |
|---|---|---|---|---|
| 1,577,943 | A * | 3/1926 | Woodley | 33/197 |
| 1,733,775 | A * | 10/1929 | Chalmers et al. | 33/197 |
| 1,849,961 | A * | 3/1932 | Snelling | 33/197 |
| 2,426,003 | A * | 8/1947 | Dixen | 33/197 |
| 2,500,800 | A * | 3/1950 | Carlson | 30/167.1 |
| 2,659,159 | A * | 11/1953 | Jarrett et al. | 33/197 |
| 2,687,753 | A * | 8/1954 | Mount | 144/27 |
| 2,844,175 | A * | 7/1958 | Zern | 30/167.1 |
| 2,938,554 | A * | 5/1960 | Schlage | 30/167.1 |
| 2,961,773 | A * | 11/1960 | Honn | 33/197 |
| 4,306,823 | A | 12/1981 | Nashlund | |
| 4,331,411 | A | 5/1982 | Kessinger et al. | |
| 4,715,125 | A | 12/1987 | Livick | |
| 4,914,822 | A * | 4/1990 | Wetherington | 33/197 |
| 5,067,537 | A * | 11/1991 | Offner | 144/372 |
| 5,222,845 | A | 6/1993 | Goldstein et al. | |
| D356,271 | S | 3/1995 | Adamik et al. | |
| 5,511,312 | A * | 4/1996 | Hobbs | 30/167.1 |
| 5,524,684 | A * | 6/1996 | Stuckel | 144/144.51 |

(Continued)

*Primary Examiner* — Christopher Fulton
(74) *Attorney, Agent, or Firm* — Michael Best & Friedrich LLP

(57) ABSTRACT

A door lock locator configured to attach to a door having a latch edge and to locate the door lock in relation to a strike plate. The door lock locator includes an edge wall having an edge hole locator, a first wall extending from the edge wall and including a bore hole locator, a second wall extending from the edge wall and cooperating with the first wall to attach the door lock locator to the door. The door lock locator also includes a strike plate locator coupled to one of the edge wall, the first wall, and the second wall. The strike plate locator has a protrusion that selectively engages the strike plate to locate the edge hole locator and the bore hole locator.

29 Claims, 12 Drawing Sheets

U.S. PATENT DOCUMENTS

| | | | |
|---|---|---|---|
| D372,433 S | 8/1996 | Brutscher et al. | |
| 5,569,001 A | 10/1996 | Brutscher et al. | |
| 5,573,352 A | 11/1996 | Matadobra | |
| 5,762,115 A * | 6/1998 | Shouse | 144/144.51 |
| 6,193,449 B1 | 2/2001 | Diaz | |
| 6,390,738 B1 | 5/2002 | Fridman | |
| 6,398,465 B1 * | 6/2002 | Monge | 408/1 R |
| 6,910,837 B2 | 6/2005 | Trettin et al. | |
| 6,954,989 B1 | 10/2005 | Morton | |
| 6,994,498 B2 | 2/2006 | Trettin et al. | |
| 7,003,889 B1 | 2/2006 | Luciani | |
| D516,401 S | 3/2006 | Snider et al. | |
| D516,891 S | 3/2006 | Thomas | |
| D519,337 S | 4/2006 | Thomas | |
| D521,330 S | 5/2006 | Thomas | |
| 7,073,991 B2 | 7/2006 | Thomas | |
| 7,112,014 B2 | 9/2006 | Thomas | |
| 7,210,880 B2 | 5/2007 | Snider et al. | |
| 7,241,091 B1 * | 7/2007 | Yang | 409/178 |
| 7,246,449 B2 * | 7/2007 | Pierson et al. | 33/613 |
| 7,252,463 B2 | 8/2007 | Valdez | |
| 7,316,527 B2 | 1/2008 | Trettin et al. | |
| 7,356,902 B2 | 4/2008 | Snider et al. | |
| 7,530,770 B2 | 5/2009 | Chao | |
| 7,752,762 B2 * | 7/2010 | King et al. | 33/197 |
| 2004/0020809 A1 | 2/2004 | Allan et al. | |
| 2004/0060241 A1 * | 4/2004 | Staples et al. | 49/380 |
| 2004/0240950 A1 | 12/2004 | Trettin et al. | |
| 2005/0072701 A1 | 4/2005 | Allan et al. | |
| 2005/0129472 A1 | 6/2005 | Liu et al. | |
| 2006/0133902 A1 | 6/2006 | Brewington | |
| 2006/0272166 A1 | 12/2006 | Adkins et al. | |
| 2007/0009335 A1 | 1/2007 | Brewington | |
| 2007/0041800 A1 | 2/2007 | Santos | |
| 2007/0086866 A1 * | 4/2007 | Shute et al. | |
| 2007/0227016 A1 | 10/2007 | Tarter | |
| 2008/0052999 A1 | 3/2008 | King et al. | |
| 2008/0210338 A1 * | 9/2008 | Ponce | 144/144.51 |

* cited by examiner

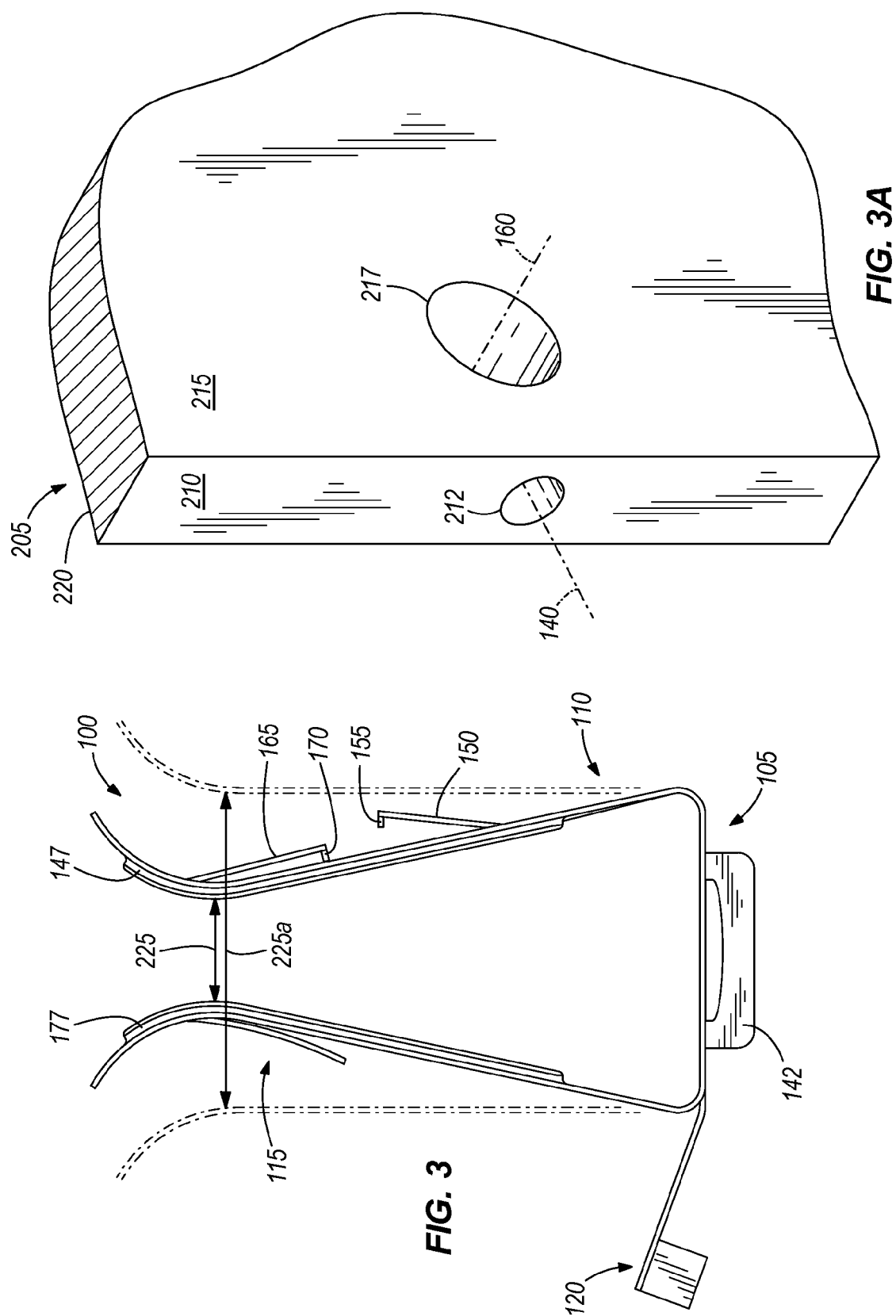

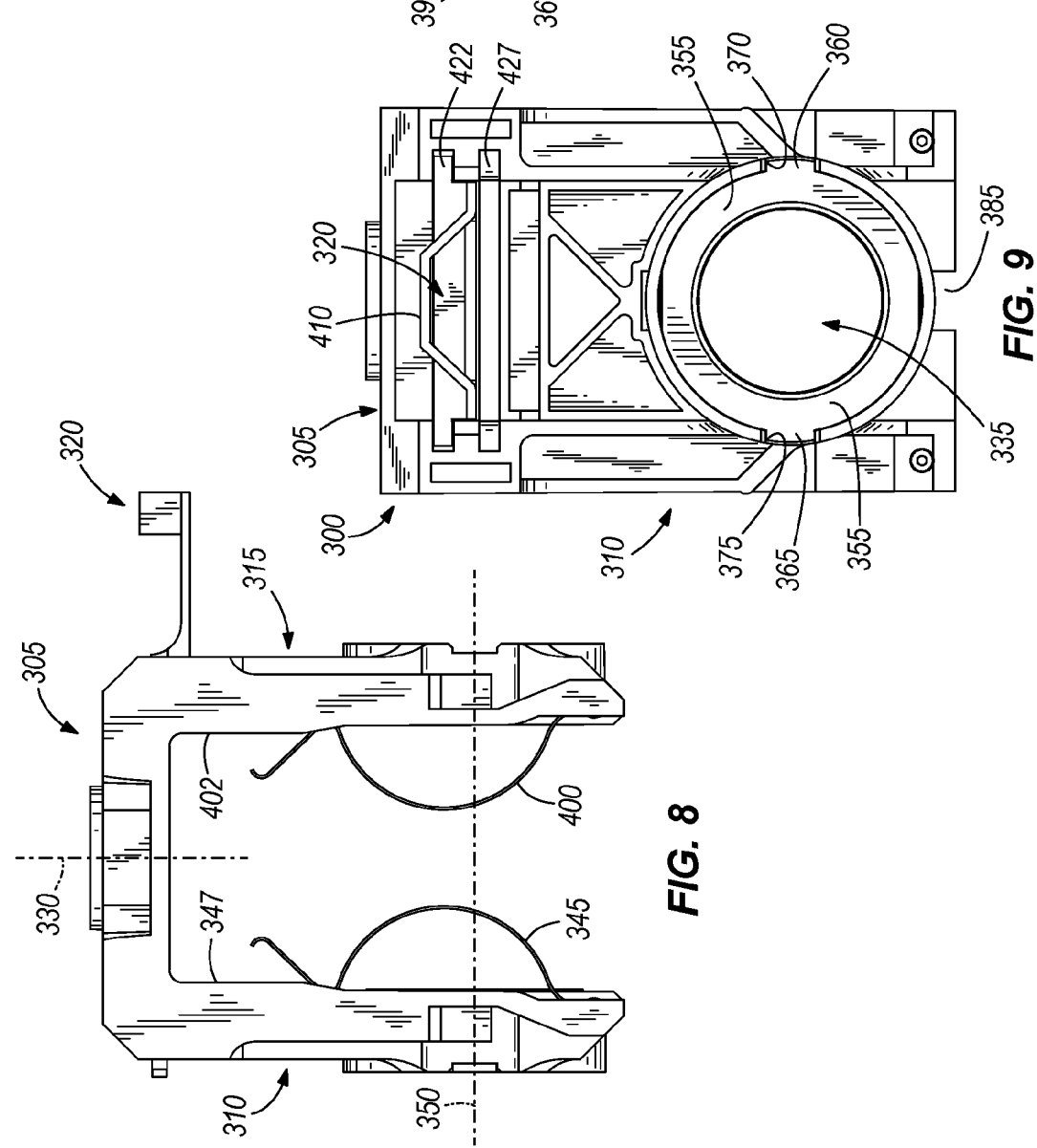

DOOR LOCK LOCATING TOOL KIT

RELATED APPLICATION DATA

This application is a continuation application of PCT/CN2010/071879 filed Apr. 19, 2010 and is fully incorporated herein by reference.

BACKGROUND

The present invention relates to a locating tool kit, and more particularly to a door lock locator for correctly positioning the edge hole and the bore hole in a door for the installation of a door lock, a door latch and knob assembly, or a deadbolt, and a door latch mortiser including an interchangeable scorer holder.

A door includes a latch edge or latch stile, a hinge edge or hanging stile, a first face, and an opposing second face. The door is hung in a door frame. The door frame includes a latch door jamb and a hinge door jamb. A strike plate including a strike plate opening is mounted on the latch door jamb. The door is pivotally attached to the hinge door jamb by hinges mounted to the hinge edge and the hinge door jamb. When the door is in a closed position, the latch edge abuts the latch door jamb and a door latch extending from the latch edge engages the strike plate opening. This engagement latches the door in the closed position. A door lock or deadbolt engages a strike plate opening in the closed position in a similar manner.

SUMMARY

The invention provides, in one aspect, a door lock locator configured to attach to a door having a latch edge and to locate the door lock in relation to a strike plate. The door lock locator includes an edge wall having an edge hole locator, a first wall extending from the edge wall and including a bore hole locator, a second wall extending from the edge wall and cooperating with the first wall to attach the door lock locator to the door. The door lock locator also includes a strike plate locator coupled to one of the edge wall, the first wall, and the second wall. The strike plate locator has a protrusion that selectively engages the strike plate to locate the edge hole locator and the bore hole locator.

The invention provides, in another aspect, a door lock locator configured to attach to a door having a latch edge and to locate the door lock in relation to a strike plate. The door lock locator includes an edge wall defining an aperture through the edge wall, an edge tab flexibly connected to the edge wall and positioned in the aperture, the tab having an edge hole center punch. The door lock locator also includes a first wall flexibly connected to the edge wall, the first wall defining an aperture through the first wall and a bore hole tab flexibly connected to the first wall and positioned in the aperture, the tab having a bore hole center punch. The door lock locator further includes a second wall flexibly connected to the edge wall and cooperating with the first wall to clamp the door lock locator to the door and a strike plate locator movably coupled to one of the edge wall, the first wall, and the second wall. The strike plate locator has a protrusion that is movable to a position in which the protrusion engages the strike plate to locate the edge hole center punch and the bore hole center punch.

The invention provides, in another aspect, a door lock locator configured to attach to a door having a latch edge and to locate the door lock in relation to a strike plate. The door lock locator includes an edge wall defining an edge hole aperture, and a first wall extending from the edge wall, the first wall defining a bore hole aperture and including a frame and a biasing member, the frame fixed with respect to the edge wall. The door lock locator also includes a second wall extending from the edge wall and cooperating with the first wall to attach the door lock locator to the door, the second wall including a frame and a biasing member, the frame fixed with respect to the edge wall. The door lock locator further includes a strike plate locator selectively coupled to one of the edge wall, the first wall, and the second wall, the strike plate locator having a protrusion that selectively engages the strike plate to locate the edge hole aperture and the bore hole aperture.

The invention provides, in another aspect, a mortiser including a handle having a chamber and an interchangeable scorer holder. The scorer holder has a first side and a second side, a first scorer fixedly attached to the first side, and a second scorer different from the first scorer fixedly attached to the second side. The interchangeable scorer holder can be positioned in a first orientation substantially within the chamber to expose the first scorer, and the interchangeable scorer holder can be positioned in a second orientation substantially within the chamber to expose the second scorer.

The invention provides, in another aspect, a method of installing a door lock on a door. The method includes the steps of positioning a door lock locator on the door, the door lock locator including an edge hole locator, a bore hole locator, and a strike plate locator, moving the door into proximity of a strike plate, engaging the strike plate locator with the strike plate to adjust the vertical position of the door lock locator on the door, identifying the desired position of an edge hole in the door and a bore hole in the door using the door lock locator, creating the edge hole and the bore hole, positioning a portion of a mortiser having a scorer and a chisel in the edge hole to locate the scorer in a desired position, scoring the door with the scorer to identify material to be removed from the door, and removing the identified material using the chisel.

Other features and aspects of the invention will become apparent by consideration of the following detailed description and accompanying drawings.

BRIEF DESCRIPTION OF THE DRAWINGS

FIG. 3 is a top view of the door lock locator of FIG. 1.

FIG. 3A is a perspective of a door.

FIG. 8 is a top view of the door lock locator of FIG. 6.

FIG. 9 is a side view of the door lock locator of FIG. 6.

FIG. 10 is another side view of the door lock locator of FIG. 6.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 3B:
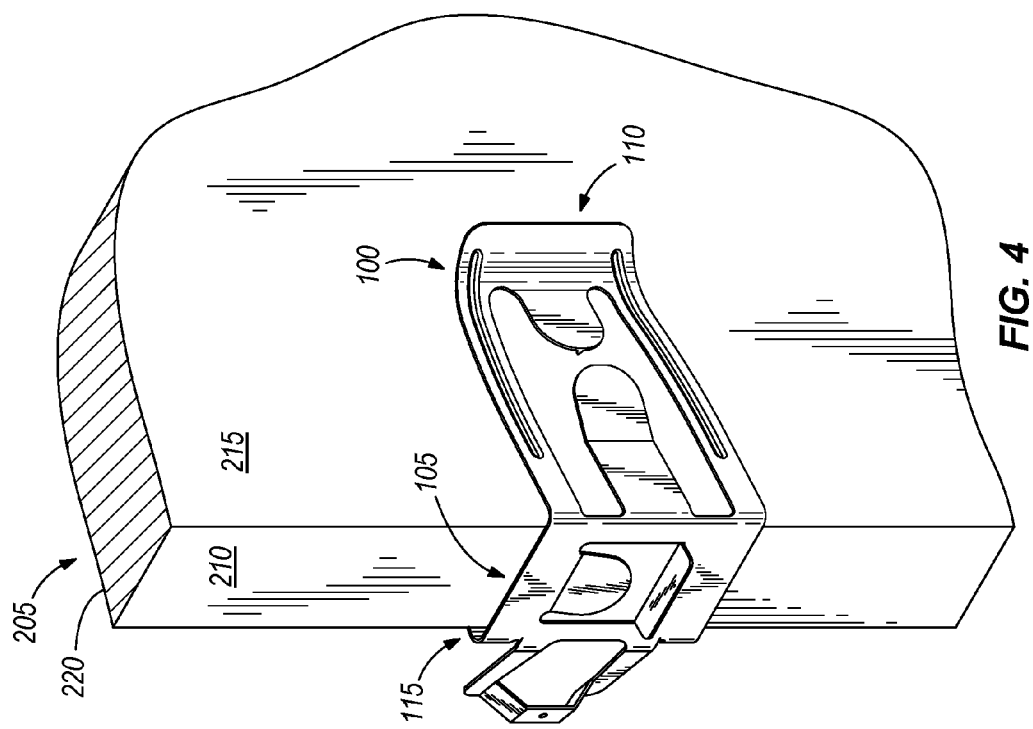
FIG. 3B is another perspective view of the door.
Figure 5:
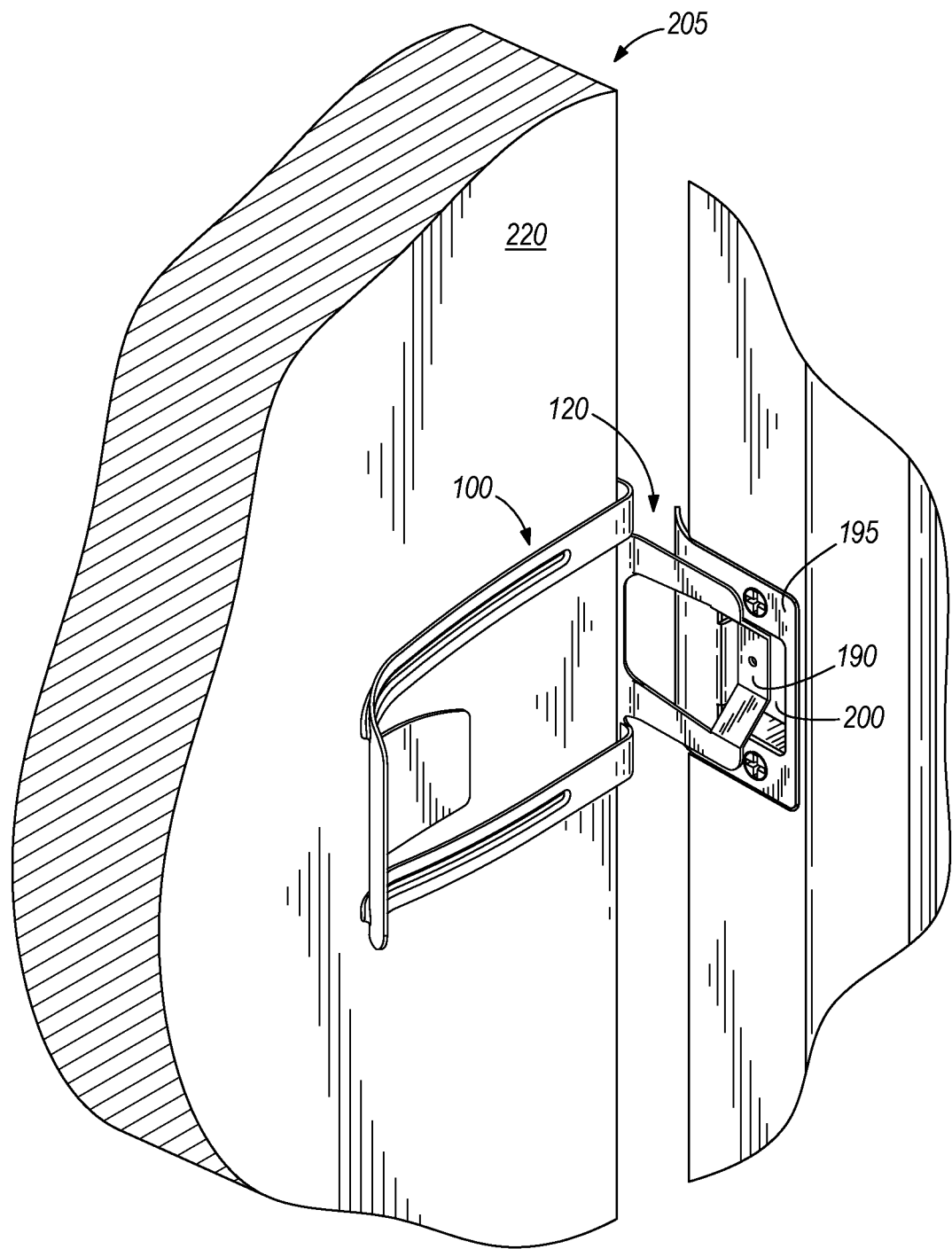
FIG. 5 is another perspective view of the door lock locator of FIG. 1 clamped to a door and engaged with a strike plate.

Installing a door lock, a door latch and knob assembly, or a deadbolt assembly requires an edge hole 212 to be drilled into a latch edge 210 and a bore hole 217 to be drilled through the door 205 from a first face 215 to a second face 200, as shown in FIG. 3A. An edge hole axis 140 extends through the center point of the edge hole 212. A bore hole axis 175 extends through the center point of the bore hole 217. The edge hole axis 140 is substantially normal to and coplanar with the bore hole axis 175. The edge hole 212 intersects the bore hole 217 inside the door 205. When properly positioned, the plane containing the edge hole axis 140 and the bore hole axis 175 will be substantially perpendicular to the latch edge 210. The edge hole 212 is centered along the width of the latch edge 210. Typical doors 205 have a latch edge 210 width varying between 1⅜ inches (3.49 centimeters) and 1¾ inches (4.45 centimeters) in width. The setback of the bore hole 217 is the distance from the latch edge 210 to the center point of the bore hole 217. The two standard setbacks are 2⅜ inches (6.03 centimeters) and 2¾ inches (6.99 centimeters). The edge hole 212 and the bore hole 217 must also be properly positioned vertically on the door 205 with respect to a strike plate 195 (as shown in FIG. 5). The edge hole 212 must be positioned at the same height as a strike plate opening 200 in order for the door latch to function properly. A door lock locator 100, 300 is used to ensure that the edge hole 212 and the bore hole 217 are properly positioned on the door 200.

A mortise plate is installed on the latch edge 210. The mortise plate surrounds the edge hole 212. The mortise plate should be flush with the surface of the latch edge 210. The mortise plate is mounted flush with the surface of the latch edge 210 by creating a mortise, or hollow space, of the same shape and depth as the mortise plate in the latch edge 210. The size and shape of the mortise and mortise plate are standardized.

Figure 1:
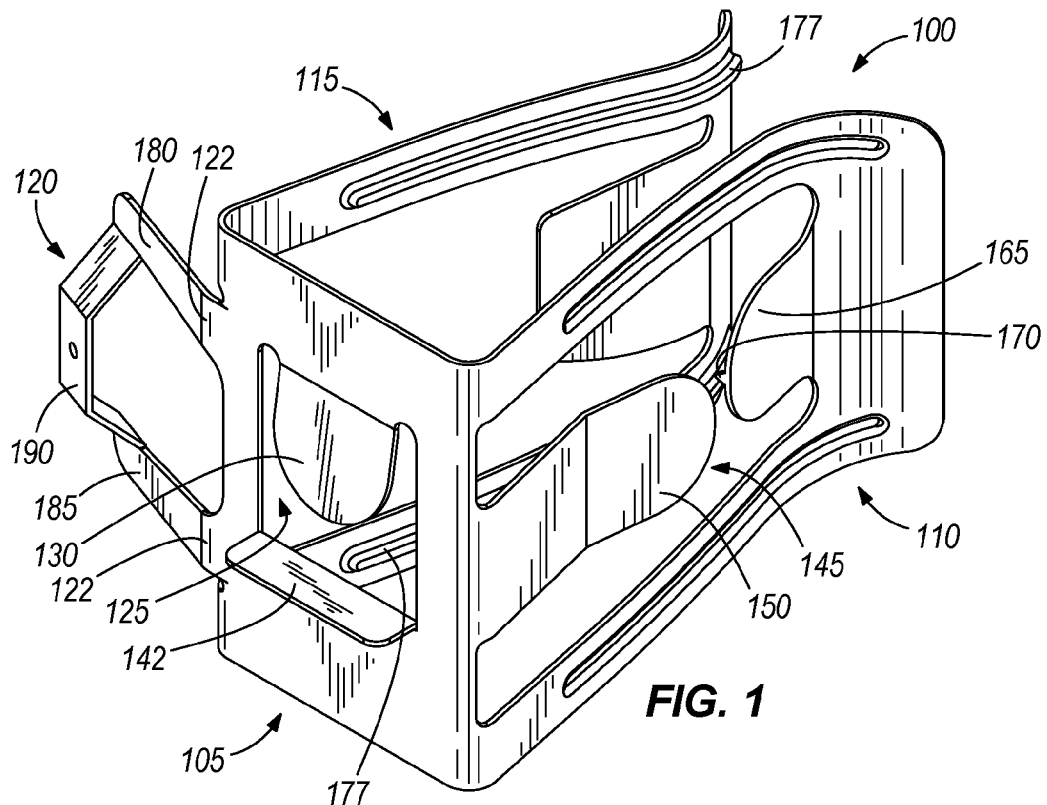
FIG. 1 is a perspective view of a door lock locator.

As shown in FIG. 1, a door lock locator 100 includes an edge wall 105, a first wall 110, a second wall 115, and a strike plate locator 120. The first wall 110 is flexibly connected to the edge wall 105. The second wall 115 is flexibly connected to the edge wall 105. The walls 105, 110, and 115 are flexibly connected such that the door lock locator 100 can move from a relaxed position to a clamped position, as explained below. The door lock locator 100 can be formed as a single piece from metal, plastic, or other suitable materials.

Figure 2:
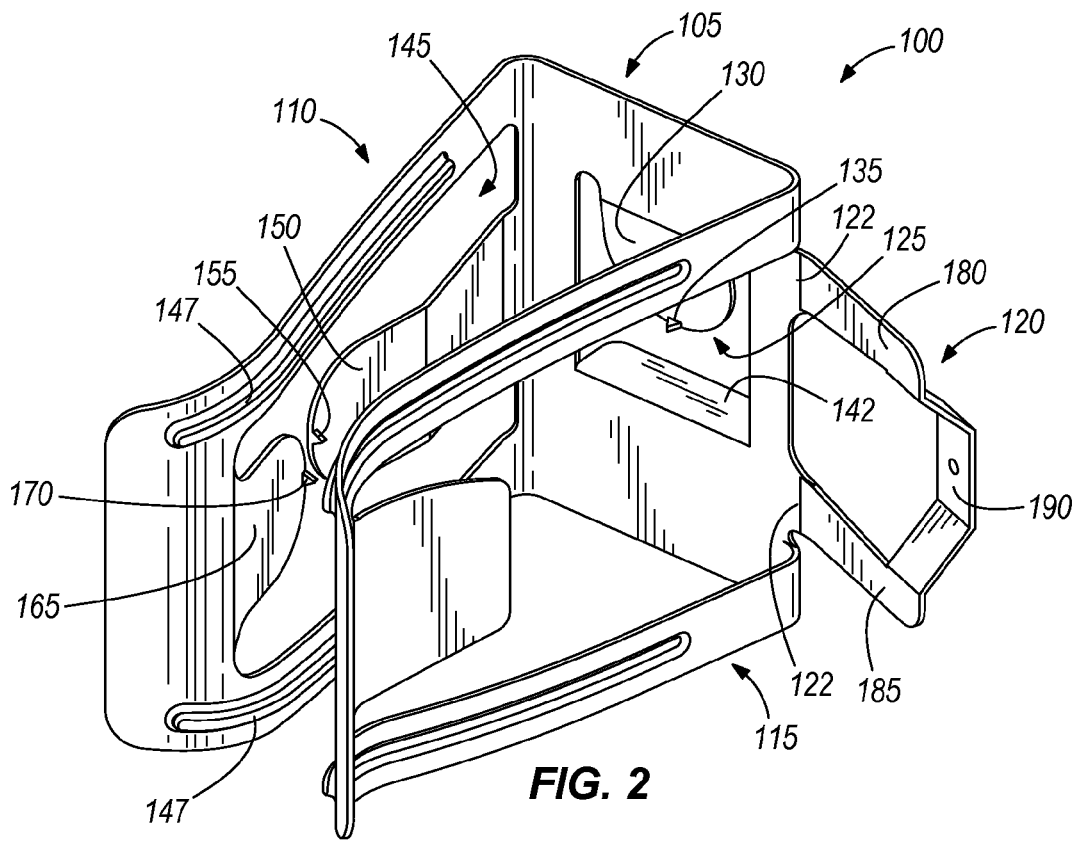
FIG. 2 is another perspective view of the door lock locator of FIG. 1

As shown in FIG. 1, the edge wall 105 defines an aperture 125 through the edge wall 105. A tab 130 is positioned in the aperture 125 and is flexibly connected to the edge wall 105. The tab 130 includes an edge hole center punch 135 (shown in FIG. 2) for making a mark on or in a door 205. The mark made by the edge hole center punch 135 defines an edge hole axis 140 through the door 205 (shown in FIGS. 3A-3B). The edge hole center punch 135 functions as an edge hole locator. The tab 130 is flexibly connected such that the tab 130 can move from a relaxed position to a punching position. In the relaxed position, the tab 130 is not co-planar with the edge wall 105. In the punching position, the tab 130 is substantially co-planar with the edge wall 105. In the illustrated embodiment, the tab 130 is flexibly connected to the edge wall 105 by a living hinge. In some embodiments, the tab 130 defines a marking aperture. The marking aperture is sized and shaped to allow the point of a writing instrument to pass through the tab 130. In these embodiments, the marking aperture functions as the edge hole locator.

A removal handle 142 extends from edge wall 105. The handle 142 is sized to allow a user to grip the handle 142 to remove the door lock locator 100 from the door 205.

As shown in FIG. 1, the first wall 110 defines an aperture 145 through the first wall 110. A pair of contact portions 147 extend from the first wall 110 for gripping a door (shown in FIG. 2). A tab 150 is flexibly connected to the first wall 110 and is positioned in the aperture 145. The tab 150 includes a first bore hole center punch 155 (shown in FIG. 2) for making a mark on or in the door 205. The mark made by the first bore hole center punch 155 defines an first bore hole axis 160 through the door 205 that corresponds with a first setback (shown in FIG. 3A). The tab 150 is flexibly connected such that the tab 150 can move from a relaxed position to a punching position. In the relaxed position, the tab 150 is not co-planar with the first wall 110. In the punching position, the tab 150 is substantially co-planar with the first wall 110. A second tab 165 having a second bore hole center punch 170 for making a mark on or in the door 205 is flexibly connected to the second wall 115 and positioned in the aperture 145. The mark made by the second bore hole center punch 170 defines a second bore hole axis 175 through the door 205 that corresponds with a second setback (shown in FIG. 3B). The bore hole center punches 155, 170 function as bore hole locators. The tab 165 is flexibly connected such that the tab 165 can move from a relaxed position to a punching position. In the relaxed position, the tab 165 is not co-planar with the first wall 110. In the punching position, the tab 165 is substantially co-planar with the first wall 110. The tabs 150, 165 can be flexibly connected to the first wall 110 by living hinges. In some embodiments, only one tab 150 is positioned in the aperture 145. The single tab 150 would include the first bore hole center punch 155 and the second bore hole center punch 170. In other embodiments, the tabs 150, 165 define a marking aperture. The marking aperture or apertures are sized and shaped to allow the point of a writing instrument to pass through the tab 150, 165. In these embodiments, the marking aperture or apertures function as a bore hole locator.

As shown in FIG. 1, a pair of contact portions 177 extend from the second wall 115 and cooperate with the contacting portions 147 to facilitate gripping the door 205. In some embodiments, a soft material (such as rubber, plastic, Teflon, etc.) forms a portion of the contact portions to enhance the grip of the door lock locator on the door and to protect the door from scratches or other damage.

The strike plate locator 120 is movably coupled to the edge wall 105. The strike plate locator 120 includes two arms 180, 185 and a protrusion 190. As shown in FIG. 5, the protrusion 190 is sized and shaped such that the protrusion 190 can engage a strike plate 195. In the illustrated embodiment, a living hinge 122 movably couples the strike plate locator 120 to the edge wall 105 to allow the protrusion 190 to selectively engage a strike plate opening 200 in the strike plate 195, as shown in FIG. 5. In other embodiments, the strike plate locator 120 can be movably coupled to the first wall 110 or to the second wall 115 as may be desired.

Figure 4:
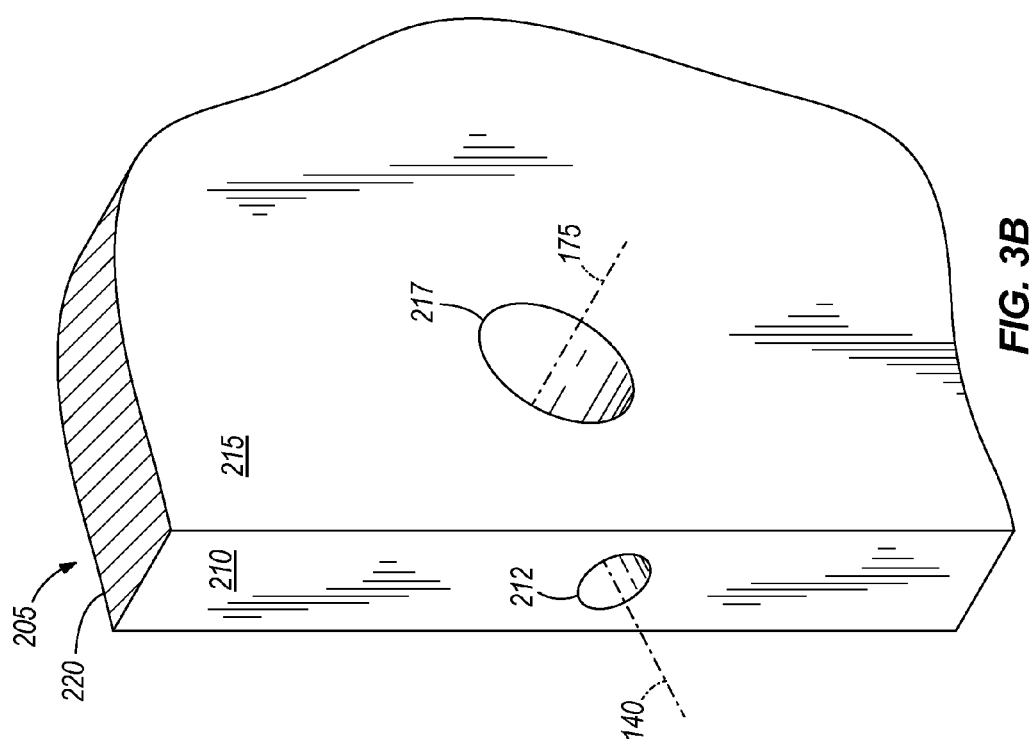
FIG. 4 is a perspective view of the door lock locator of FIG. 1 clamped to a door.

As shown in FIG. 4, in use, the door lock locator 100 is clamped to the door 205. The first wall 110 and the second wall 115 squeeze the door 205 to clamp the door lock locator 100 to the door 205. In a relaxed position, the first wall 110 and the second wall 115 each extend at an oblique angle from the edge wall 105 and cooperate to define a gap 225 (as shown in FIG. 3). The gap 225 is less than the width of the door 205. In a clamped position (shown in phantom lines in FIG. 3), the first wall 110 and the second wall 115 are displaced to a substantially perpendicular position with respect to the edge wall 105 and cooperate to define a second gap 225a larger than the first gap 225. The flexible connections between the walls 105, 110, 115 allow the door lock locator 100 to be attached to doors of varying widths. When the door lock locator 100 is clamped to the door 205, the edge wall 105 contacts the latch edge 210 so that the edge wall 105 is substantially flush with the latch edge 210 and the edge hole locator 135 is centered between the opposing door faces 215, 220.

To set the correct vertical position of the door lock locator 100 on the door 205, the door lock locator 100 is clamped on the door 205 at about the same height as the strike plate 195. As shown in FIG. 5, with the strike plate locator 120 moved to an extended position, the user partially closes the door 205 and slides the door lock locator 100 vertically along the door 205 so that the protrusion 190 of the strike plate locator 120 engages the strike plate opening 200 in the strike plate 195. This process positions the door lock locator 100 on the door 205 at the correct vertical position with respect to the strike plate 195.

The edge hole center punch 135 is depressed to make an edge hole center point. The user applies a force to the tab 130, thereby moving the tab 130 to the punching position and pressing the center punch 135 into the latch edge 210. The force can be applied by hand or with a tool. One of the bore hole center punches 155, 170 is depressed to make a bore hole center point, depending on the appropriate setback for the bore hole. After selecting the appropriate setback, the user applies a force to the corresponding tab 150, 165, thereby moving the tab 150, 165 to the punching position and pressing the corresponding bore hole center punch 155, 170 into the door face 215.

After the edge hole center point and bore hole center point are made, the user removes the door lock locator 100 from the door 205 with the removal handle 142. Then, the user lines up an appropriately sized cutting tool (for example, a hole saw or a drill bit) with each of the center points and cuts the edge hole 212 and the bore hole 217 into the door 205. When the door lock locator 100 is properly positioned, the edge hole axis 140 is substantially normal to and coplanar with the first bore hole axis 160 and the edge hole axis 140 is substantially normal to and coplanar with the second bore hole axis 175.

In some embodiments, user instructions are included on a surface of the door lock locator 100. In some of these embodiments, the user instructions are stamped or molded onto a surface of the door lock locator 100.

Figure 6:
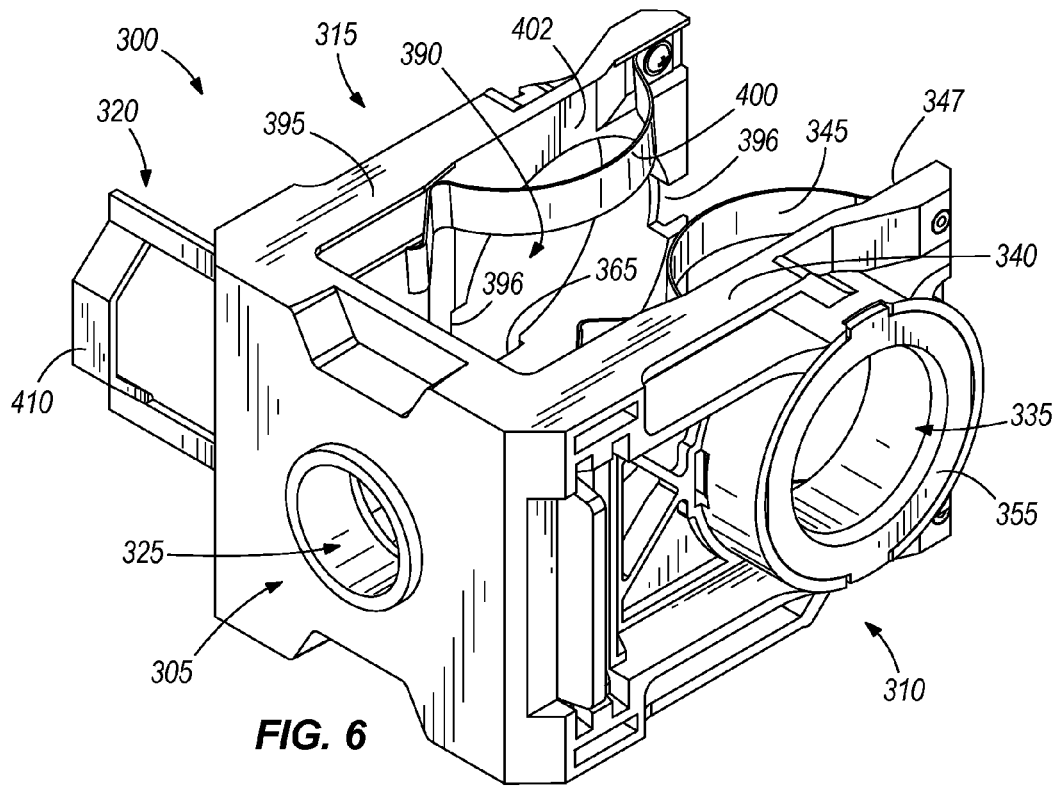
FIG. 6 is a perspective view of another door lock locator.

As shown in FIG. 6, another door lock locator 300 includes an edge wall 305, a first wall 310, a second wall 315, and a strike plate locator 320. The first wall 310 and the second wall 315 extend from the edge wall 305. In the illustrated embodiment, the walls 305, 310, and 315 and the strike plate locator 320 are made of plastic, with other materials also being suitable.

As shown in FIG. 6, the edge wall 305 defines an edge hole aperture 325 through the edge wall 305. The edge hole aperture 325 functions as an edge hole locator and the center of the edge hole aperture 325 defines an edge hole axis 330 (shown in FIG. 8). The edge hole aperture 325 is circular and is centered in the edge wall 305. The edge hole aperture 325 is sized to receive a cutting tool, for example, a hole saw or a drill bit, that is the proper size for a standard door lock hole. In other embodiments, the edge hole aperture 325 could be larger than the desired door lock hole size and adapters that match standard door lock hole sizes could be provided for insertion into the aperture 325.

The first wall 310 includes a frame 340 that is fixedly attached to the edge wall 305. Unlike in the construction of FIGS. 1-5, the first wall 310 does not move substantially with respect to the edge wall 305. A biasing member 345 in the form of two leaf springs is positioned on the inner surface 347 of the frame 340. The biasing member 345 can be displaced from a relaxed position to a clamped position. In the clamped position, the biasing member 345 is compressed towards the inner surface 347 of the frame 340. While in the illustrated embodiment, the biasing member 345 includes leaf springs, other embodiments may employ other biasing members. For example, one embodiment includes a biasing member 345 that employs an inner wall secured to the inner surface 347 of the frame 340 by a spring or multiple springs.

Figure 11:
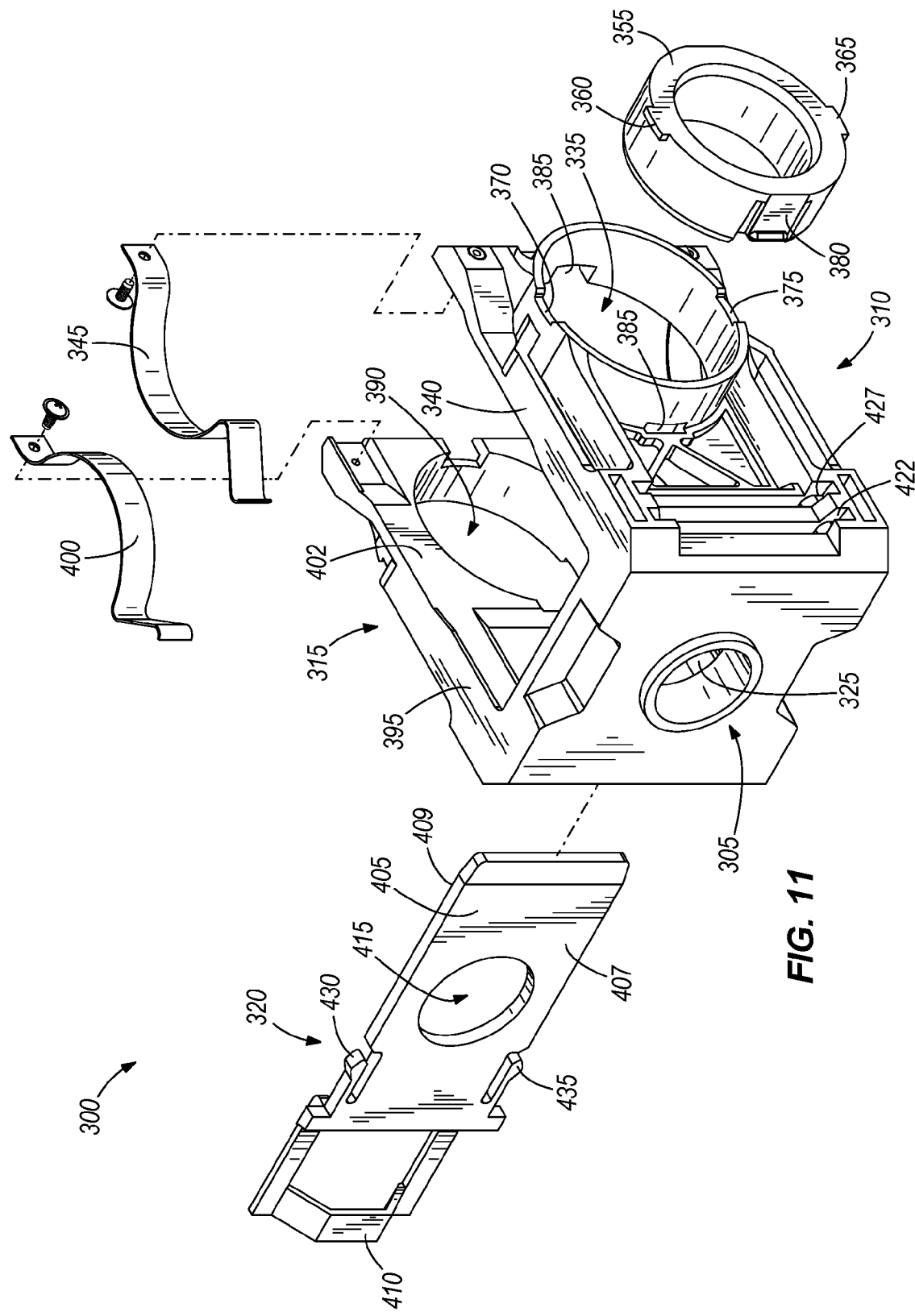
FIG. 11 is an exploded perspective view of the door lock locator of FIG. 6.

As shown in FIG. 6, a bore hole aperture 335 passes through the first wall 310. The bore hole aperture 335 functions as a bore hole locator and the center of the bore hole aperture 335 lies on a bore hole axis 350 (shown in FIG. 8). The bore hole axis 350 is substantially normal to and coplanar with the edge hole axis 330. As shown in FIG. 11, a pair of notches 370, 375 are cut into the outer portion of the frame 340 surrounding the bore hole aperture 335. A second pair of notches 385 are cut into the inner portion of the frame 340 surrounding the bore hole aperture 335.

As shown in FIG. 9, a first setback aperture 422 and a second setback aperture 427 pass through the first wall 310. The first setback aperture 422 and the second setback aperture 427 are sized and shaped to allow the strike plate locator 320 to be inserted through either of the setback apertures 422, 427.

As shown in FIGS. 6 and 11, a cylindrical sleeve 355 is removably inserted into the bore hole aperture 335. As shown in FIG. 11, the cylindrical sleeve 355 is positively positioned in the bore hole aperture 335 by a pair of tabs 360, 365 positioned on the outer edge of the sleeve 355 that engage the pair of notches 370, 375 in the frame 340. The cylindrical sleeve 355 is releasably secured in the bore hole aperture 335 by a pair of locking tabs 380 positioned on the outer edge of the sleeve 355 that releasably engage the pair of notches 385 in the frame 340. As shown in FIG. 6, when positioned in the bore hole aperture 335, the cylindrical sleeve 355 is coaxial with the bore hole aperture 335. The cylindrical sleeve 355 can be made of metal, plastic, or other suitable materials. The cylindrical sleeve 355 is sized to receive a cutting tool, for example, a hole saw or a drill bit, that is the proper size for a standard door knob hole. The cylindrical sleeve 355 protects the rest of the door lock locator 300 from damage by the cutting tool. Multiple cylindrical sleeves 355, each sized for a different size of door knob hole, can be included with the door lock locator 300.

Figure 12:
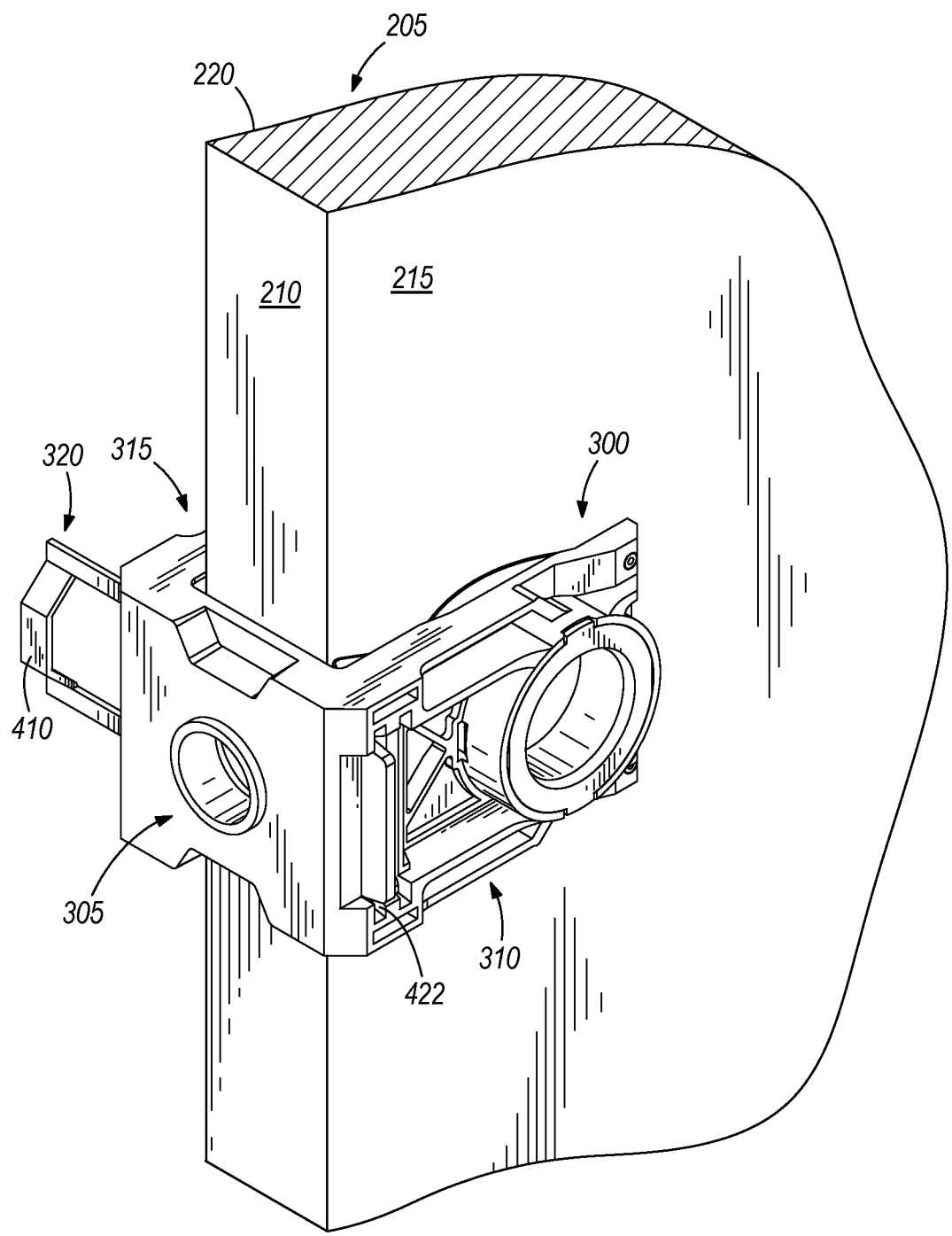
FIG. 12 is a perspective view of the door lock locator of FIG. 6 attached to a door.

As shown in FIG. 6, the second wall 315 includes a frame 395 that is fixedly attached to the edge wall 305. Unlike in the construction of FIGS. 1-5, the second wall 315 does not move substantially with respect to the edge wall 305. A biasing member 400 in the form of two leaf springs is positioned on the inner surface 402 of the frame 395. The biasing member 400 can be displaced from a relaxed position to a clamped position. In the clamped position, the biasing member 400 is compressed towards the inner surface 402 of the frame 395. The biasing member 400 of the second wall 305 cooperates with the biasing member 345 of the first wall 310 to attach the door lock locator 300 to the door 205, as shown in FIG. 12. When both biasing members 345, 400 are in the relaxed position, the biasing members 345, 400 define a relaxed gap. When both biasing members 345, 400 are in the clamped position, the biasing members 345, 400 define a clamped gap. While in the illustrated embodiment, the biasing member 400 includes leaf springs, other embodiments may employ other biasing members. For example, one embodiment includes a biasing member 400 that employs an inner wall secured to the inner surface 402 of the frame 395 by a spring or multiple springs.

A bore hole aperture 390 passes through the second wall 315 and is coaxial with the bore hole aperture 335 through the first wall 310. The bore hole aperture 390 functions as a bore hole locator and the center of the bore hole aperture 390 lies on the bore hole axis 350 (shown in FIG. 8). As shown in FIG. 10, a pair of notches 392, 394 are cut into the outer portion of the frame 395 surrounding the bore hole aperture 390. A second pair of notches 396 (shown in FIG. 6) are cut into the inner portion of the frame 395 surrounding the bore hole aperture. As shown in FIG. 10, a cylindrical sleeve identical to the cylindrical sleeve 355 described above can be removably inserted into the bore hole aperture 390 in the same manner as described above with respect to bore hole aperture 335.

As shown in FIG. 10, a first setback aperture 420 and a second setback aperture 425 pass through the second wall 315. The first setback aperture 420 and the second setback aperture 425 are sized and shaped to allow the strike plate locator 320 to be inserted through either of the setback apertures 420, 425. The first setback aperture 422 of the first wall 310 and the first setback aperture 420 of the second wall 315 are aligned to form a pair of first setback apertures, such that the strike plate locator 320 can be inserted through both the first setback aperture 422 of the first wall 310 and the first setback aperture 420 of the second wall 315. The second setback aperture 427 of the first wall 310 and the second setback aperture 425 of the second wall 315 are aligned to form a pair of second setback apertures, such that the strike plate locator 320 can be inserted through both the second setback aperture 427 of the first wall 310 and the second setback aperture 425 of the second wall 315. In some embodiments, more than two pairs of setback apertures are included in the first wall 310 and the second wall 315. In other embodiments, a single pair of setback apertures is included in the first wall 310 and the second wall 315.

As shown in FIG. 11, the strike plate locator 320 includes a flat portion 405 and a protrusion 410. The flat portion 405 extends between a front surface 407 and a rear surface 409 and defines an edge hole aperture 415. The edge hole aperture 415 is sized and shaped to match or be larger than the edge hole aperture 325 through the edge wall 305. The strike plate locator 320 also includes a pair of locking tabs 430, 435 positioned near an end of the flat portion 405.

Figure 7:
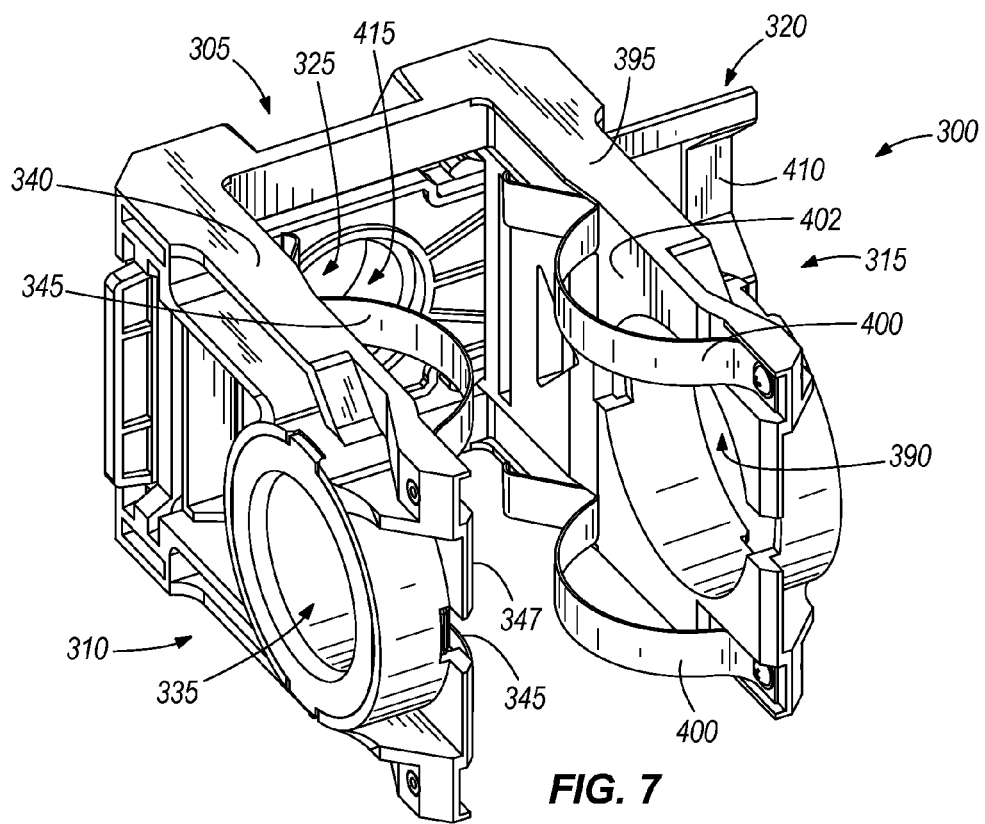
FIG. 7 is another perspective view of the door lock locator of FIG. 6.

The strike plate locator 320 is selectively coupled to the second wall 315 by inserting the strike plate locator 320 through a setback aperture 420 or 425. As shown in FIG. 7, in an inserted position, the center of the edge hole aperture 415 of the strike plate locator 320 is aligned with the axis 330 defined by the edge hole aperture 325 of the edge wall 305. The locking tabs 430, 435 engage the frame 395, thereby securing the strike plate locator 320 in the inserted position. The protrusion 410 is sized and shaped such that the protrusion 410 can engage a strike plate 195, as will be described with respect to FIG. 5. In some embodiments, the strike plate locator 320 can be selectively coupled to the edge wall 305. In other embodiments, the strike plate locator 320 can be selectively coupled to the first wall 310.

As shown in FIG. 12, in use, the door lock locator 300 attaches to a door 205 that includes a latch edge 210 and two opposing door faces 215, 220. Before attaching the door lock locator 300 to the door 205, the user must select the appropriate setback for the bore hole 217. The two pairs of setback apertures 420, 422 and 425, 427 correspond with the standard setbacks for door knobs and locks. When the strike plate locator 320 is in the inserted position and the door lock locator 300 is attached to the door 205, the rear surface 409 of the strike plate locator 320 abuts the latch edge 210 of the door 205. This determines the setback of the bore hole 217 through the door 205 by positioning the bore hole axis 350 with respect to the latch edge 210. The user can adjust the setback of the bore hole 217 by inserting the strike plate locator 320 through different pairs of setback apertures 420, 422 and 425, 427. After selecting the desired setback, the user inserts the strike plate locator 320 through the corresponding pair of setback apertures 420, 422 or 425, 427. For the purposes of this description, the strike plate locator 320 is inserted through the first pair of setback apertures 420, 422 as shown in FIG. 12.

The door lock locator 300 is slid onto the door 205, such that the biasing member 345 of the first wall 310 is compressed by the door face 215 and the biasing member 400 of the second wall 315 is compressed by second face 220, thereby attaching the door lock locator 300 to the door 205. The biasing members 345, 400 facilitate the attachment of the door lock locator 300 to doors of varying widths. When the door lock locator 300 is attached to the door, the rear surface 409 of the flat portion 405 of the strike plate locator 320 is substantially flush with the latch edge 210 and the edge hole aperture 325 is centered between the opposing door faces 215, 220. The biasing members 345, 400 facilitate the centering of the edge hole aperture 325 between the door faces 215, 220.

To set the correct vertical position of the door lock locator 300 on the door 205, the door lock locator 300 is attached to the door 205 at about the same height as the strike plate 195. As described above with respect to the construction of FIGS. 1-5 and as shown in FIG. 5, the user partially closes the door 205 and slides the door lock locator 300 vertically along the latch edge 210 so that the protrusion 410 of the strike plate locator 320 engages the strike plate opening 200 of the strike plate 195. This process positions the door lock locator 300 at the correct vertical position on the door 205 with respect to the strike plate 195.

To cut the edge hole 212 in the latch edge 210, the user inserts a cutting tool (for example, a hole saw or a drill bit) into the edge hole aperture 325 and proceeds to cut a hole into the latch edge 210. The edges of the cutting tool contact the edge hole aperture 325 to correctly position the edge hole 212 on the latch edge 210.

To cut the bore hole 217 through the door faces 215, 220, the user inserts the cutting tool into the cylindrical sleeve 355 and proceeds to cut a hole through the door faces 215, 220. The edges of the cutting tool contact the cylindrical sleeve 355 to correctly position the bore hole 217 through the door faces 215, 220. In some embodiments, the cylindrical sleeve 355 is omitted and the user inserts the cutting tool into a bore hole aperture 335, 390 instead of into the cylindrical sleeve 355.

In some embodiments, user instructions are included on a surface of the door lock locator 300. In some of these embodiments, the user instructions are molded into a surface of the door lock locator 300.

Figure 13:
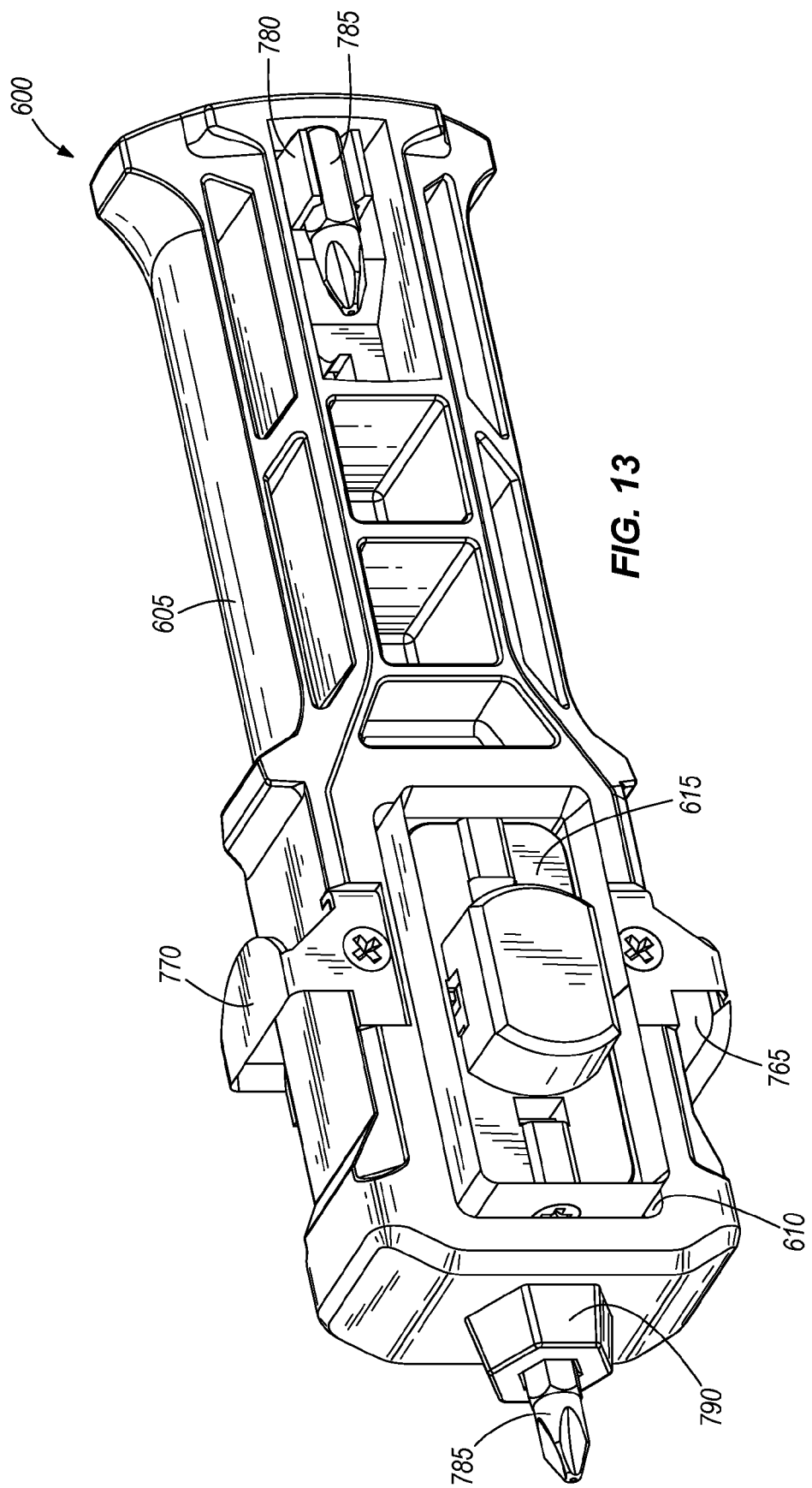
FIG. 13 is a perspective view of a mortiser suitable for use with door lock locators of FIGS. 1-12.

FIGS. 13-16 illustrate a mortiser 600 suitable for use with the door lock locator of FIGS. 1-12 to complete a door lock installation. Of course, the mortiser 600 could also be used by itself to create a mortise. As shown in FIG. 13, the mortiser 600 includes a handle 605 having a chamber 610 and an interchangeable scorer holder 615 positioned in and releasably secured in the chamber 610.

Figure 14:
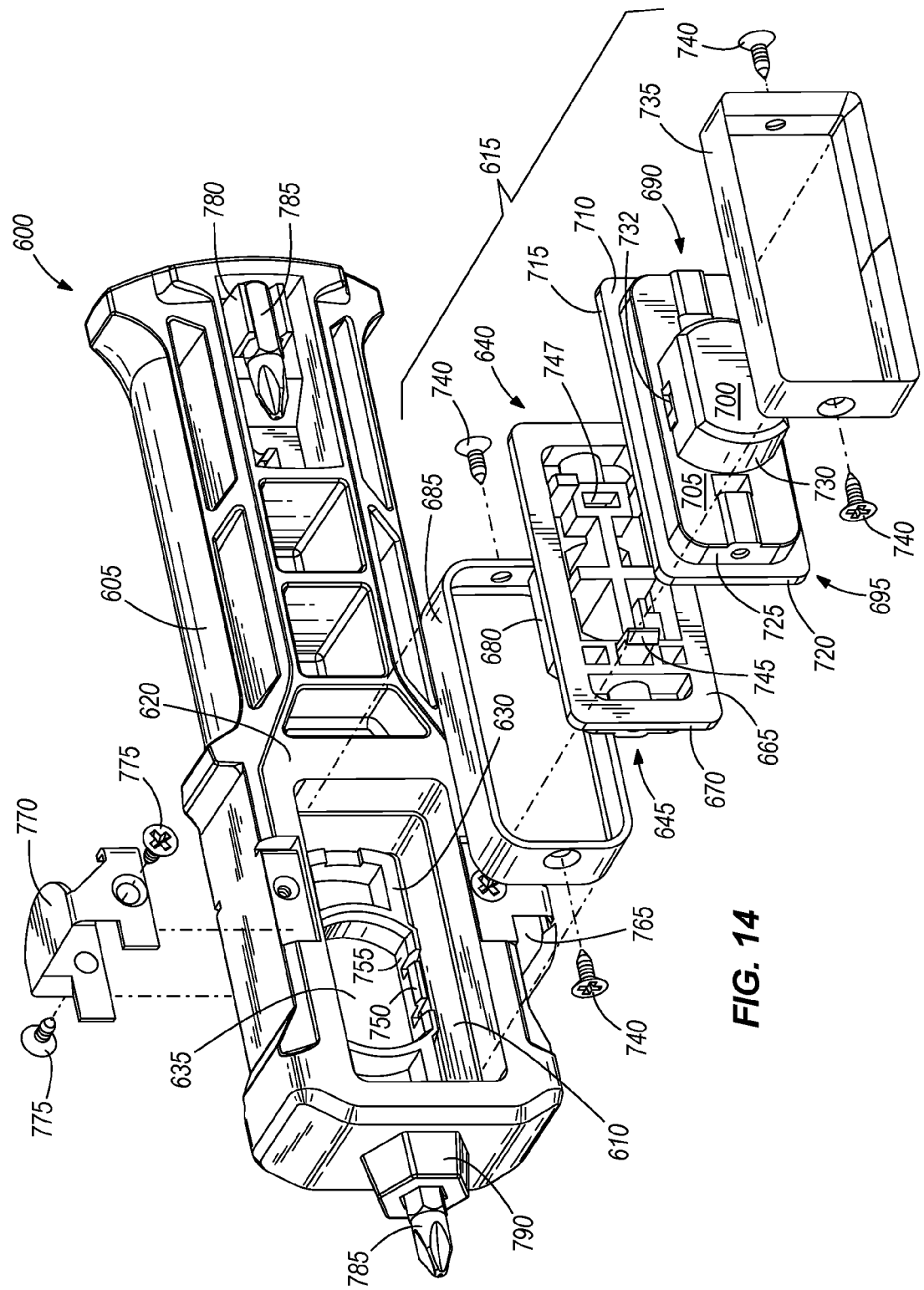
FIG. 14 is an exploded perspective view of the mortiser of FIG. 13.

As shown in FIG. 14, the handle 605 includes an outer surface 620, an opposing outer surface 625 (shown in FIG. 16), and an interior surface 630. The outer surface 620, the opposing outer surface 625, and the interior surface 630 are substantially parallel to one another. The chamber 610 extends from the outer surface 620 to the interior surface 630. An aperture 635 extends through the handle 605 from the interior surface 630 to the opposing outer surface 625. The cross-sectional area of the aperture is less than the cross-sectional area of the chamber 610. A tab 750 is positioned on a perimeter wall 755 of the aperture 635. In some embodiments, the tab 750 is integrated into the perimeter wall 755.

Figure 15:
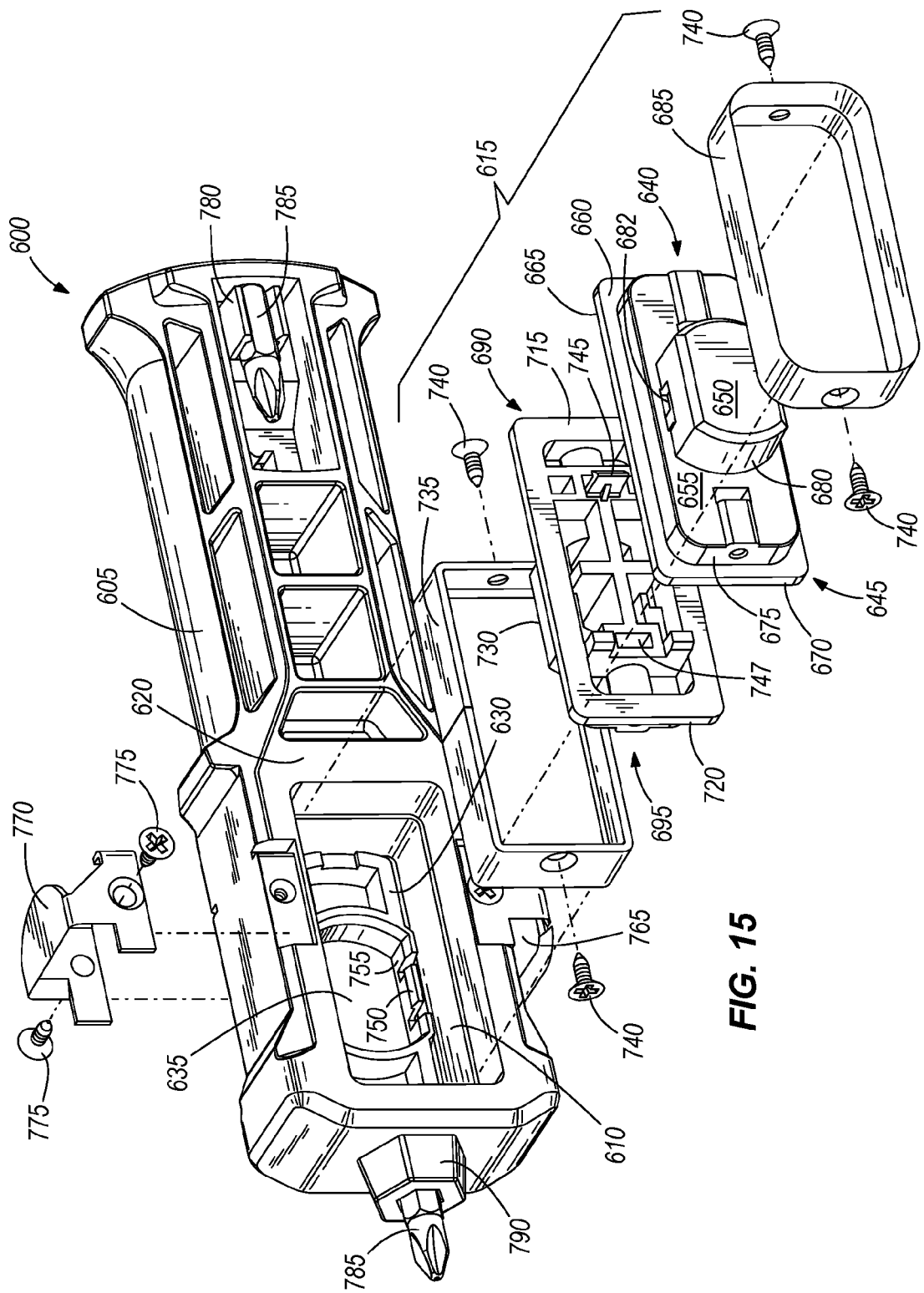
FIG. 15 is another exploded perspective view of the mortiser of FIG. 13.

As shown in FIG. 15, the interchangeable scorer holder 615 has a first side 640 and a second side 690. The first side 640 has a body 645 including a guide post surface 650, a front surface 655, an intermediate surface 660, and a rear surface 665. The guide post surface 650, the front surface 655, the intermediate surface 660, and the rear surface 665 are substantially parallel to one another. A base 670 extends between the rear surface 665 and the intermediate surface 660. A platform 675 extends between the intermediate surface 660 and the front surface 655. A guide post 680 extends between the front surface 655 and the guide post surface 650. The guide post 680 includes a recess 682 for engaging the tab 750. The cross-sectional area of the base 670 is greater than the cross-sectional area of the platform 675 and the cross-sectional area of the platform 675 is greater than the cross-sectional area of the guide post 680. As shown in FIG. 14, a tab 745 and an opening 747 are positioned on the rear surface 665 and are configured to engage a corresponding opening 747 and a corresponding tab 745 on the second side 690 to secure the first side 640 to the second side 690. A scorer 685 surrounds the perimeter of the platform 675 and extends past the front surface 655, but not past the guide post surface 650. The distance between the top of the scorer 685 and the front surface 655 is equal to or greater than the depth of a desired mortise plate. In some embodiments, a screw is used to secure the first side 640 to the second side 690.

As shown in FIG. 14, the second side 690 has a body 695 including a guide post surface 700, a front surface 705, an intermediate surface 710, and a rear surface 715. The guide post surface 700, the front surface 705, the intermediate surface 710, and the rear surface 715 are substantially parallel to one another. A base 720 extends between the rear surface 715 and the intermediate surface 710. A platform 725 extends between the intermediate surface 710 and the front surface 705. A guide post 730 extends between the front surface 705 and the guide post surface 700. The guide post 730 includes a recess 732 for engaging the tab 750. The cross-sectional area of the base 720 is greater than the cross-sectional area of the platform 725 and the cross-sectional area of the platform 725 is greater than the cross-sectional area of the guide post 730. A scorer 735 surrounds the perimeter of the platform 725 and extends past the front surface 705, but not past the guide post surface 700. As shown in FIG. 15, a tab 745 and an opening 747 are positioned on the rear surface 715 and are configured to engage the corresponding opening 747 and the corresponding tab 715 on the rear surface 665 to secure the first side 640 to the second side 690. The distance between the top of the scorer 735 and the front surface 705 is equal to or greater than the depth of a desired mortise plate.

The second scorer 735 is different than the first scorer 685. In one construction, the first scorer 685 is a round corner scorer and the second scorer 735 is a square corner scorer. Each scorer 685, 735 is attached to the respective side by a pair of screws 740. The sides 640, 690 are made of plastic and the scorers 685, 735 are made of metal. In other embodiments, the sides 640, 690 and the scorers 685, 735 are made of other suitable materials.

The interchangeable scorer holder 615 can be positioned within the chamber 610 in two orientations. In either orientation, the scorer holder 615 is substantially within the chamber 610. As shown in FIGS. 13-14, in the first orientation, the first scorer 685 is exposed such that at least a portion of the first scorer 685 and the first guide post 680 extend out of the chamber 610 and past the outer surface 620 of the handle 605. The second guide post 730 is received by the aperture 635. The aperture 635 and the guide post 730 have similar perimeter shapes. The scorer holder 615 is releasably secured in the chamber 610 by the tab 750. The tab 750 engages the recess 732, thereby securing the scorer holder 615 in the chamber 610. The scorer holder 615 can be released and removed from the chamber 610 by applying a force to the second guide post 730 through the aperture 635 (shown in FIG. 16).

As shown in FIG. 15, in the second orientation, the second scorer 735 is exposed such that at least a portion of the second scorer 735 and the second guide post 730 extend out of the chamber 610 and past the outer surface 620 of the handle 605. The first guide post 680 is received by the aperture 635. The aperture 635 and the guide post 680 have similar perimeter shapes. The scorer holder 615 is secured and released in a similar fashion as it is in the first orientation. The scorer holder 615 is releasably secured in the chamber 610 by the tab 750. The tab 750 engages the recess 682, thereby securing the scorer holder 615 in the chamber 610. The scorer holder 615 can be released and removed from the chamber 610 by applying a force to the first guide post 680 through the aperture 635.

As shown in FIG. 14, a first chisel 765 and a second chisel 770 are attached to the handle 605. The first chisel 765 corresponds to the first scorer 685 and the second chisel 770 corresponds to the second scorer 735. The first chisel 765 is a round corner chisel and the second chisel 770 is a square corner chisel. Each chisel 765, 770 is fixedly attached to the handle 605 by a pair of screws 775. Of course, one chisel or more than two chisels could be attached to the handle if desired.

Figure 16:
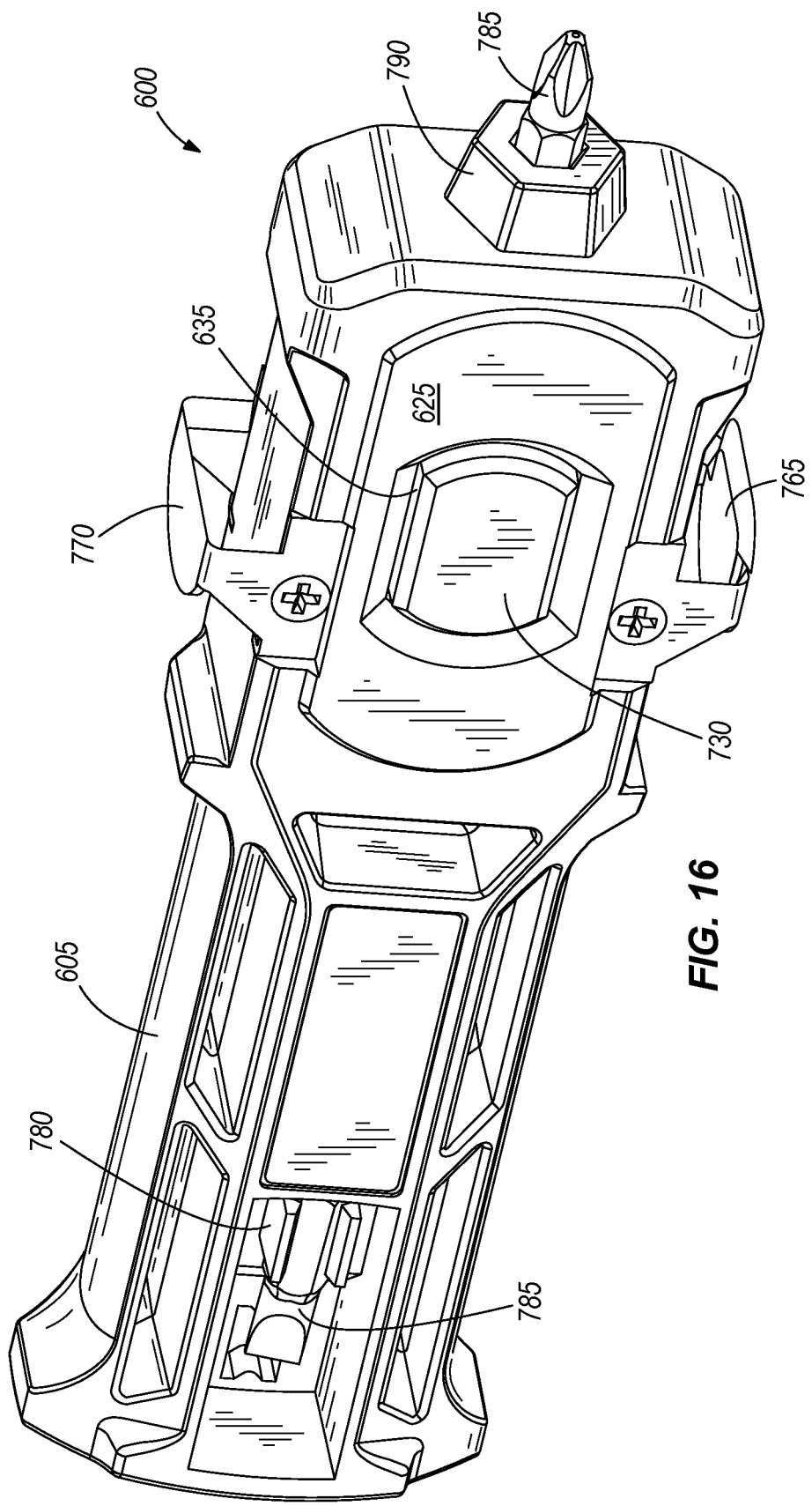
FIG. 16 is another perspective view of the mortiser of FIG. 13.

As shown in FIGS. 13 and 16, two bit holders 780 are attached to the handle 605 for removably attaching a removable tool bit 785. Of course, fewer than two bit holders or more than two bit holders could be attached to the handle if desired. The removable tool bits 785 are shown as a Phillips-head screw driver bit and a flat-head screw driver bit. Of course, other types of tool bits could be used if desired, for example, a drill bit or hex key bit.

A chuck 790 is formed as part of the handle 605 and is used to support the removable tool bit 785 for use. The removable tool bit 785 is secured in the chuck 790 by an appropriate securing method, for example, magnetically or with a press fit. In some embodiments, the handle 605 does not include a chuck 790.

In use, the user determines which orientation of the interchangeable scorer holder 615 is appropriate for the mortise plate to be used. The mortiser 600 is used in the same manner for both the first orientation and the second orientation. The first orientation will be used for purposes of description. After using the door lock locator of FIGS. 1-12 to drill an edge hole into a door as described above, the user inserts the first guide post 680 into the edge hole until the scorer 685 contacts the outer surface of the latch edge. The guide post 680 is shaped so that a rounded portion of the guide post 680 contacts at least a portion of the round wall defining the edge hole. This positions the scorer 685 with respect to the edge hole. While holding the handle 605, the user then applies a force to the opposing outer surface 625 until the front surface 655 is flush with the latch edge of the door. The scorer 685 is thereby driven into the latch edge to a depth equal to or slightly greater than the depth of the mortise plate, creating a mortise-score. The force can be applied using a hammer or other striking tool. The user then removes the scorer 685 from the latch edge. The mortise-score defines the mortise to be removed from the latch edge 800. The user then uses the first chisel 765 to remove the material inside the mortise-score. After the material inside the mortise-score has been removed, the mortise is formed and the user can install the mortise plate.

Thus, the mortiser 600 and door lock locators 100, 300 work with one another to complete the installation of a door lock.

Various features of the invention are set forth in the following claims.

What is claimed is:

1. A door lock locator configured to attach to a door having a latch edge and to locate the door lock in relation to a strike plate, the door lock locator comprising:
    an edge wall having an edge hole locator;
    a first wall extending from the edge wall and including a bore hole locator;
    a second wall extending from the edge wall and cooperating with the first wall to attach the door lock locator to the door; and
    a strike plate locator coupled to one of the edge wall, the first wall, and the second wall, the strike plate locator having a protrusion that selectively engages the strike plate to locate the edge hole locator and the bore hole locator.

2. The door lock locator of claim 1, wherein at least a portion of the first and second side walls move between a first position and a second position.

3. The door lock locator of claim 1, wherein the edge wall, the first wall, the second wall, and the strike plate locator are formed as a single piece.

4. The door lock locator of claim 1, wherein the edge hole locator is movable between a relaxed position and a punching position.

5. The door lock locator of claim 1, wherein the bore hole locator is movable between a relaxed position and a punching position.

6. The door lock locator of claim 1, wherein the bore hole locator includes two bore hole center punches spaced apart from one another, each bore hole locator corresponding to a different setback.

7. The door lock locator of claim 1, wherein the protrusion is movable to a position in which the protrusion engages the strike plate.

8. The door lock locator of claim 1, wherein the first wall includes a frame and a biasing member and the second wall includes a frame and a biasing member.

9. The door lock locator of claim 1, wherein the first wall and the second wall define a first setback aperture and a second setback aperture, and the strike plate locator is selectively insertable through one of the first setback aperture and the second setback aperture.

10. A door lock locator configured to attach to a door having a latch edge and to locate the door lock in relation to a strike plate, the door lock locator comprising:
    an edge wall defining an aperture through the edge wall;
    an edge tab flexibly connected to the edge wall and positioned in the aperture, the tab having an edge hole center punch;
    a first wall flexibly connected to the edge wall, the first wall defining an aperture through the first wall;
    a bore hole tab flexibly connected to the first wall and positioned in the aperture, the tab having a bore hole center punch;
    a second wall flexibly connected to the edge wall and cooperating with the first wall to clamp the door lock locator to the door; and
    a strike plate locator movably coupled to one of the edge wall, the first wall, and the second wall, the strike plate locator having a protrusion that is movable to a position in which the protrusion engages the strike plate to locate the edge hole center punch and the bore hole center punch.

11. The door lock locator of claim 10, wherein the edge wall, the first wall, and the second wall are formed as a single piece.

12. The door lock locator of claim 10, further comprising a living hinge disposed between the strike plate locator and the edge wall to interconnect the strike plate locator and the first wall.

13. The door lock locator of claim 10, wherein in a relaxed position, the first wall and the second wall define a gap between a portion of the first wall and a portion of the second wall and in a clamped position, the first wall and the second wall define a second gap between the same portion of the first wall and the same portion of the second wall, the second gap being larger than the first gap.

14. The door lock locator of claim 13, wherein the first wall and the second wall each extend at an oblique angle from the edge wall when in the relaxed position.

15. The door lock locator of claim 10, further comprising a second bore hole tab flexibly connected to the first wall and positioned in the aperture, the second bore hole tab having a second bore hole center punch.

16. The door lock locator of claim 10, wherein the bore hole center punch and the second bore hole center punch are spaced apart from one another, each bore center punch corresponding to a different setback.

17. A door lock locator configured to attach to a door having a latch edge and to locate the door lock in relation to a strike plate, the door lock locator comprising:
    an edge wall defining an edge hole aperture;
    a first wall extending from the edge wall, the first wall defining a bore hole aperture and including a frame and a biasing member, the frame fixed with respect to the edge wall;
    a second wall extending from the edge wall and cooperating with the first wall to attach the door lock locator to the door, the second wall including a frame and a biasing member, the frame fixed with respect to the edge wall; and
    a strike plate locator selectively coupled to one of the edge wall, the first wall, and the second wall, the strike plate locator having a protrusion that selectively engages the strike plate to locate the edge hole aperture and the bore hole aperture.

18. The door lock locator of claim 17, wherein the first wall defines a first setback aperture and a second setback aperture, and the strike plate locator is selectively insertable through one of the first setback aperture and the second setback aperture.

19. The door lock locator of claim 18, wherein the second wall defines a first setback aperture corresponding to and aligned with the first setback aperture of the first wall and a second setback aperture corresponding to and aligned with the second setback aperture of the first wall.

20. The door lock locator of claim 17, wherein the strike plate locator contacts the latch edge when the door lock locator is attached to the door.

21. The door lock locator of claim 17, wherein the biasing member of the first wall and the biasing member of the second wall cooperate to define a relaxed gap and cooperate to define a clamped gap that is larger than the relaxed gap.

22. The door lock locator of claim 17, wherein the biasing members include leaf springs.

23. The door lock locator of claim 17, wherein a cylindrical sleeve is removably inserted into the bore hole aperture.

24. The door lock locator of claim 17, wherein the second wall defines a second bore hole aperture through the second wall, the second bore hole aperture being coaxial with the bore hole aperture.

25. A mortiser comprising:
a handle including a chamber;
an interchangeable scorer holder, the scorer holder having a first side and a second side;
a first scorer fixedly attached to the first side;
a second scorer different from the first scorer and fixedly attached to the second side;
the interchangeable scorer holder positioned in a first orientation substantially within the chamber to expose the first scorer; and
the interchangeable scorer holder positioned in a second orientation substantially within the chamber to expose the second scorer.

26. The mortiser of claim 25, further comprising a chisel fixedly attached to the handle.

27. The mortiser of claim 25, further comprising a chuck fixedly attached to the handle for removably attaching a tool bit.

28. The mortiser of claim 27, further comprising a tool bit holder fixedly attached to the handle for removably attaching the tool bit.

29. A method of installing a door lock on a door, the method comprising:
positioning a door lock locator on the door, the door lock locator including an edge hole locator, a bore hole locator, and a strike plate locator;
moving the door into proximity of a strike plate;
engaging the strike plate locator with the strike plate to adjust the vertical position of the door lock locator on the door;
identifying the desired position of an edge hole in the door and a bore hole in the door using the door lock locator;
creating the edge hole and the bore hole;
positioning a portion of a mortiser having a scorer and a chisel in the edge hole to locate the scorer in a desired position;
scoring the door with the scorer to identify material to be removed from the door; and
removing the identified material using the chisel.

* * * * *